(12) United States Patent
Kim

(10) Patent No.: US 9,565,739 B2
(45) Date of Patent: Feb. 7, 2017

(54) LAMP CONTROL DEVICE OF CONSTRUCTION MACHINE AND LAMP CONTROL METHOD THEREFOR

(71) Applicant: VOLVO CONSTRUCTION EQUIPMENT AB, Eskilstuna (SE)

(72) Inventor: Dong-Soo Kim, Changwon-si (KR)

(73) Assignee: VOLVO CONSTRUCTION EQUIPMENT AB (SE)

( * ) Notice: Subject to any disclaimer, the term of this patent is extended or adjusted under 35 U.S.C. 154(b) by 35 days.

(21) Appl. No.: 14/653,769

(22) PCT Filed: Dec. 21, 2012

(86) PCT No.: PCT/KR2012/011250
§ 371 (c)(1),
(2) Date: Jun. 18, 2015

(87) PCT Pub. No.: WO2014/098287
PCT Pub. Date: Jun. 26, 2014

(65) Prior Publication Data
US 2015/0334806 A1  Nov. 19, 2015

(51) Int. Cl.
*B60Q 1/00* (2006.01)
*H05B 37/02* (2006.01)
(Continued)

(52) U.S. Cl.
CPC ........... *H05B 37/0209* (2013.01); *B60K 37/06* (2013.01); *B60Q 1/0076* (2013.01); *B60Q 3/02* (2013.01);
(Continued)

(58) Field of Classification Search
CPC ........ H05B 37/02; B60K 37/06; B60Q 1/0076
(Continued)

(56) References Cited

U.S. PATENT DOCUMENTS 7,109,668 B2   9/2006 Pogodayev et al.
8,008,802 B2 * 8/2011 Leonard ................... H02J 3/14
                                                       307/29

(Continued)

FOREIGN PATENT DOCUMENTS

JP        2010042062 A    2/2010
KR  10-2016-0125778 A   12/2006

(Continued)

OTHER PUBLICATIONS

International Search Report (in English and Korean) and Written Opinion of the International Searching Authority (in Korean) for PCT/KR2012/011250, mailed Aug. 13, 2013; ISA/KR.

*Primary Examiner* — Jason M Crawford
(74) *Attorney, Agent, or Firm* — Harness, Dickey & Pierce, P.L.C.

(57) ABSTRACT

The present invention relates to a lamp control device of a construction machine and a lamp control method therefor, wherein the control of a plurality of lamps (for example: a working lamp, a deck lamp, a cabin lamp and a rear lamp) which are provided in a construction machine can be carried out by a first key input means which is a single typical switch button and a second key input means which is provided with a plurality of sub-setting keys such that unnecessary switches are removed from the inside of a cabin, thereby providing a more convenient and simplified equipment operation environment for workers.

6 Claims, 4 Drawing Sheets

(51) Int. Cl.
*B60Q 3/02* (2006.01)
*B60K 37/06* (2006.01)

(52) U.S. Cl.
CPC ....... *H05B 37/029* (2013.01); *B60K 2350/104* (2013.01); *B60K 2350/1032* (2013.01)

(58) Field of Classification Search
USPC ...... 315/77, 80, 82; 362/464, 487–489, 523, 362/529
See application file for complete search history.

(56) References Cited

U.S. PATENT DOCUMENTS

| | | | | |
|---|---|---|---|---|
| 8,093,901 | B2* | 1/2012 | Petrin | H04L 12/2829 |
| | | | | 324/415 |
| 8,214,061 | B2* | 7/2012 | Westrick, Jr. | H05B 37/0218 |
| | | | | 315/312 |
| 2005/0128666 | A1* | 6/2005 | Pogodayev | H05B 41/245 |
| | | | | 361/58 |
| 2006/0144669 | A1 | 7/2006 | Asakage et al. | |
| 2006/0284586 | A1* | 12/2006 | Hagberg | B60K 35/00 |
| | | | | 318/567 |
| 2007/0001617 | A1 | 1/2007 | Pogodayev et al. | |

FOREIGN PATENT DOCUMENTS

| | | |
|---|---|---|
| KR | 10-2011-0072071 A | 6/2011 |
| KR | 10-1111731 B1 | 3/2012 |

\* cited by examiner

LAMP CONTROL DEVICE OF CONSTRUCTION MACHINE AND LAMP CONTROL METHOD THEREFOR

TECHNICAL FIELD

The present invention relates to a lamp control apparatus for a construction machine and a method for controlling the same. More particularly, the present invention relates to such a lamp control apparatus for a construction machine, in which a plurality of lamps (e.g., a work lamp, a deck lamp, a cabin lamp, a rear lamp) mounted on a construction machine can be controlled only by a first key input means serving as a representative switch button and a second key input means including a plurality of sub-set keys so that the number of unnecessary switches within a cabin is reduced to make an equipment manipulation environment more convenient and simple, and a method for controlling the same.

BACKGROUND OF THE INVENTION

A conventional construction machine is provided with a plurality of the lamps in terms of characteristics thereof, and a separate switch for controlling each of the lamps.

For example, the conventional construction machine is equipped with a plurality of lamps such as a work lamp, a deck lamp, and a cabin lamp, and a separate switch for controlling each of the lamps.

Therefore, a separate switch for each lamp is provided within the cabin in order to turn on/off a plurality of lamps provided in the construction machine so that each lamp is controlled in a one-to-one manner by the manipulation of an operator.

However, since switches for controlling a plurality of lamps are provided separately for each lamp, the number of switches is increased, thus leading to an increase in the complexity of the equipment in the cabin, which contributes to inconvenience in the operation of an equipment manipulation interface by an operator.

SUMMARY OF THE INVENTION

Accordingly, the present invention has been made to solve the aforementioned problems occurring in the prior art, and it is an object of the present invention to provide a lamp control apparatus for a construction machine, in which a plurality of lamps (e.g., a work lamp, a deck lamp, a cabin lamp, a rear lamp) mounted on a construction machine can be controlled only by a first key input means serving as a representative switch button and a second key input means including a plurality of sub-set keys so that the number of unnecessary switches within a cabin is reduced to make an equipment manipulation environment more convenient and simple, and a method for controlling the lamp control apparatus.

TECHNICAL SOLUTION

To achieve the above object, in accordance with an embodiment of the present invention, there is provided a lamp control apparatus for a construction machine, which is connected to respective relays of construction machine lamps, and configured to control the on/off operation of the relays, the apparatus including:

a first key input means configured to bring a screen for setting the on/off state of the respective lamps and drive the relays to correspond to the on/off state of the lamps which is set to turn on/off the lamps;

a second key input means including keys for instructing the shift between display objects corresponding to the respective lamps and setting an on/off state of the corresponding object on the set screen; and a controller configured to alternately control the on state of the corresponding relay and the off state of the whole lamp relays using a toggle method according to preset lamp on/off combination information of the construction machine if an input operation is repeatedly performed in a state where a first key-pressing time of the first key input means is limited within a first predetermined time range, the controller being configured to bring the set screen, perform the shift of the object that corresponds to the lamp designated by an operator's input of the second key input means and set the on/off state of the corresponding lamp, and store the preset lamp on/off combination information if an input operation is performed in a state where the first key-pressing time is limited within a second predetermined time range that is different from the first predetermined time range.

Preferably, the controller may turn on the corresponding relay by the on/off combination of the preset lamp while displaying the set screen if the input operation of the first key is performed within the second predetermined time range to bring the set screen.

In addition, the controller may control the off state of the whole lamp relays using the toggle method if the input operation of the first key is performed with a limitation to the first predetermined time range in a state where the set screen is brought by the input operation of the first key and the corresponding relay is turned on.

Further, the controller may include:

a time comparison unit configured to compare the first key-pressing time of the first key input means with a predetermined reference time;

a relay control unit configured to control the preset lamp on/off combination information of the construction machine to be displayed on a screen if the input operation of the first key is performed in a state where the first key-pressing time of the first key input means is within a first predetermined time range as a result of comparison by the time comparison unit, and turn on/off the relay connected to the lamp that is designated by the second key input means using the toggle method if the input operation of the first key is performed in a state where the first key-pressing time is within a second predetermined time range that is different from the first predetermined time range; and a lamp setting unit configured to reset a lamp combination designated by a user through the second key input means among lamp combinations displayed by the relay control unit to a lamp combination which is to be turned on/off.

To achieve the above object, in accordance with another embodiment of the present invention, there is provided a method for controlling a lamp control apparatus for a construction machine, which is connected to respective relays of construction machine lamps, and configured connected to respective relays of construction machine lamps to control the on/off operation of the relays, the method including the steps of:

comparing a first key-pressing time of a first key input means, which displays a preset on/off state of the respective lamps and controls the on/off states of the respective lamps according to the preset on/off state of the respective lamps, with a predetermined reference time;

controlling the turning on of the relay of a corresponding lamp that is set to be turned on using the toggle method to correspond to once or continuous input for a first predetermined time range of the first key or controlling the turning off of the relays of the whole lamps according to lamp on/off combination information of the construction machine, which is preset and stored, if the input operation of the first key is performed in a state where the first key-pressing time of the first key input means is within the first predetermined time range as a result of the comparison;

controlling the display of the reset lamp on/off combination information of the construction machine on a screen if the input operation of the first key is performed in a state where the first key-pressing time is within a second predetermined time range as a result of the comparison;

receiving an input of the shift between the display objects corresponding to the lamps through a second key input means having setting keys in the screen display control step, determining and displaying the shift between the objects and the on/off setting of the lamps corresponding to the moved objects; and storing on/off combination items of the respective lamps, which are changed in the screen display control step.

Moreover, the controlling step further comprises controlling the display of the preset lamp on/off combination information of the construction machine on the screen and controlling the on state of the relays of the corresponding lamps according to the preset on/off combination information.

Advantageous Effect

The control apparatus and method for a construction machine in accordance with the present invention as constructed above has the following advantages.

A plurality of lamps (e.g., a work lamp, a deck lamp, a cabin lamp, a rear lamp) mounted on a construction machine can be controlled only by a first key input means serving as a representative switch button and a second key input means including a plurality of sub-set keys, thereby reducing the number of unnecessary switches within a cabin to make an equipment manipulation environment more convenient and simple.

In addition, in a construction machine provided with a plurality of lamps, the combination of lamps which is to be controlled depending on the work conditions can readily selected and set so that the operator can easily use the interface means.

BRIEF DESCRIPTION OF THE DRAWINGS

The above objects, other features and advantages of the present invention will become more apparent by describing the preferred embodiments thereof with reference to the accompanying drawings, in which.

Figure 1:
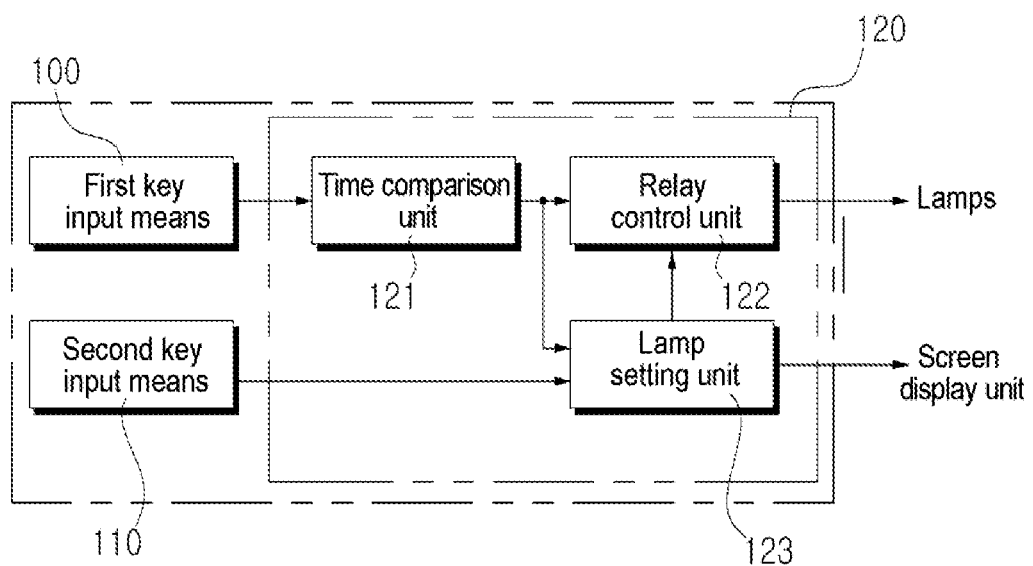
FIG. 1 is a block diagram showing the configuration of a lamp control apparatus for a construction machine in accordance with the present invention.

EXPLANATION ON REFERENCE NUMERALS
OF MAIN ELEMENTS IN THE DRAWINGS

100: first key input means
110: second key input means
120: controller
121: time comparison unit
122: relay control unit
123: lamp setting unit

DETAILED DESCRIPTION OF THE INVENTION

Now, preferred embodiments of the present invention will be described in detail with reference to the accompanying drawings. The matters defined in the description, such as the detailed construction and elements, are nothing but specific details provided to assist those of ordinary skill in the art in a comprehensive understanding of the invention, and the present invention is not limited to the embodiments disclosed hereinafter.

In order to definitely describe the present invention, a portion having no relevant to the description will be omitted, and through the specification, like elements are designated by like reference numerals.

In the specification and the claims, when a portion includes an element, it is meant to include other elements, but not exclude the other elements unless otherwise specifically stated herein.

FIG. 1 is a block diagram showing the configuration of a lamp control apparatus for a construction machine in accordance with the present invention.

As shown in FIG. 1, the inventive apparatus is a lamp control apparatus for a construction machine, which is connected to respective relays of construction machine lamps, and configured to control the on/off operation of the relays. The lamp control apparatus includes a first key input means 100, a second key input means 110, and a controller 120.

In other words, the lamp control apparatus includes a first key input means 100 which displays preset lamp on/off combination information and performs the on/off operation of the lamps, a second key input means 110 which includes a plurality of sub-set keys for designating the shift between display objects corresponding to the preset combination lamps and a user, a controller 120 which controls the on/off operation of the relays based on the information applied thereto from the first and second key input means 100 and 110.

Herein, the first key input means 100 is a user interface means which displays the preset lamp on/off combination information and performs the on/off operation of the respective lamps. That is, the controller 120 alternately controls the on state of the corresponding relay and the off state of the whole lamp relays using a toggle method according to preset lamp on/off combination information of the construction machine if an input operation of a first key is repeatedly performed in a state where a first key-pressing time of the first key input means 100 is limited within a first predetermined time range which is preset in the controller 120. In addition, the controller 120 controls bring the set screen, perform the shift between the object that corresponds to the lamp designated by an operator's input of the second key input means 110 and set the on/off state of the corresponding lamp, and store the preset lamp on/off combination information if an input operation of the first key is performed in a state where the first key-pressing time of the first key input means 100 is limited within a second predetermined time range that is different from the first predetermined time range. That is, the first key input means 100 is a user interface means which display the preset lamp combination information and performs the on/off operation of the respective lamps.

The second key input means 110 includes a plurality of sub-set keys for a user designation, which sets the shift of display objects corresponding to the preset combination lamps and the on/off state of the corresponding lamp object moved. That is, when a combination of preset lamps which it is desired to turn on/off is displayed on a screen, a plurality of sub-set keys (e.g., top, bottom, left and right shift keys) is shifted between the display objects (or icons) corresponding to the displayed lamp combination information in upward, downward, leftward and rightward directions. In addition, a provided predetermined "confirm key" is pressed to designate a lamp which it is desired to turn on/off.

The controller 120 controls the preset lamp combination information of the construction machine to be displayed on the screen if the input operation of the first key is performed in a state where the first key-pressing time of the first key input means 100 is within a second predetermined reference time range, and controls the corresponding relays to be turned on/off based on the on/off combination information of the respective lamps, which is stored in the controller 120 if the input operation of the first key is performed in a state where the first key-pressing time of the first key input means 100 is within a first predetermined reference time range that is different from the second predetermined reference time range. In addition, the controller 120 alternately controls the on/off state of the corresponding relay or the off state of the whole lamp relays using a toggle method to turn on or off a corresponding lamp if the input operation of a first key is repeatedly performed in a state where the first key-pressing time of the first key input means is within the second predetermined time range. Further, the controller 120 controls the preset lamp combination information of the construction machine to be displayed on the screen if the input operation of the first key is performed in a state where the first key-pressing time of the first key input means 100 is within the second predetermined reference time range, and resets a user designated lamp combination among the displayed lamp combinations to a lamp combination which is to be turned on/off. Specifically, the controller 120 includes: a time comparison unit 121 that compares the first key-pressing time of the first key input means with a predetermined reference time; a relay control unit 122 that reads out the lamp combination information that is preset and stored therein from a lamp setting unit 123 if the input operation of the first key is performed in a state where the first key-pressing time of the first key input means is within a first predetermined time range as a result of comparison by the time comparison unit, controls the turning on of the relays in which the corresponding lamps are set to an on state based on the set lamp combination information, and outputs the display of the set screen to a screen display unit together with the set information if the input operation of the first key is performed in a state where the first key-pressing time is within a second predetermined time range; and a lamp setting unit 123 that outputs the set information to the screen display unit and stores the set information therein if the input operation of the key is performed to correspond to the shift between display objects and the on state setting of the lamps corresponding to the corresponding display objects based on the objects displayed on the set screen of a user by the second key input means 110.

Figure 2:
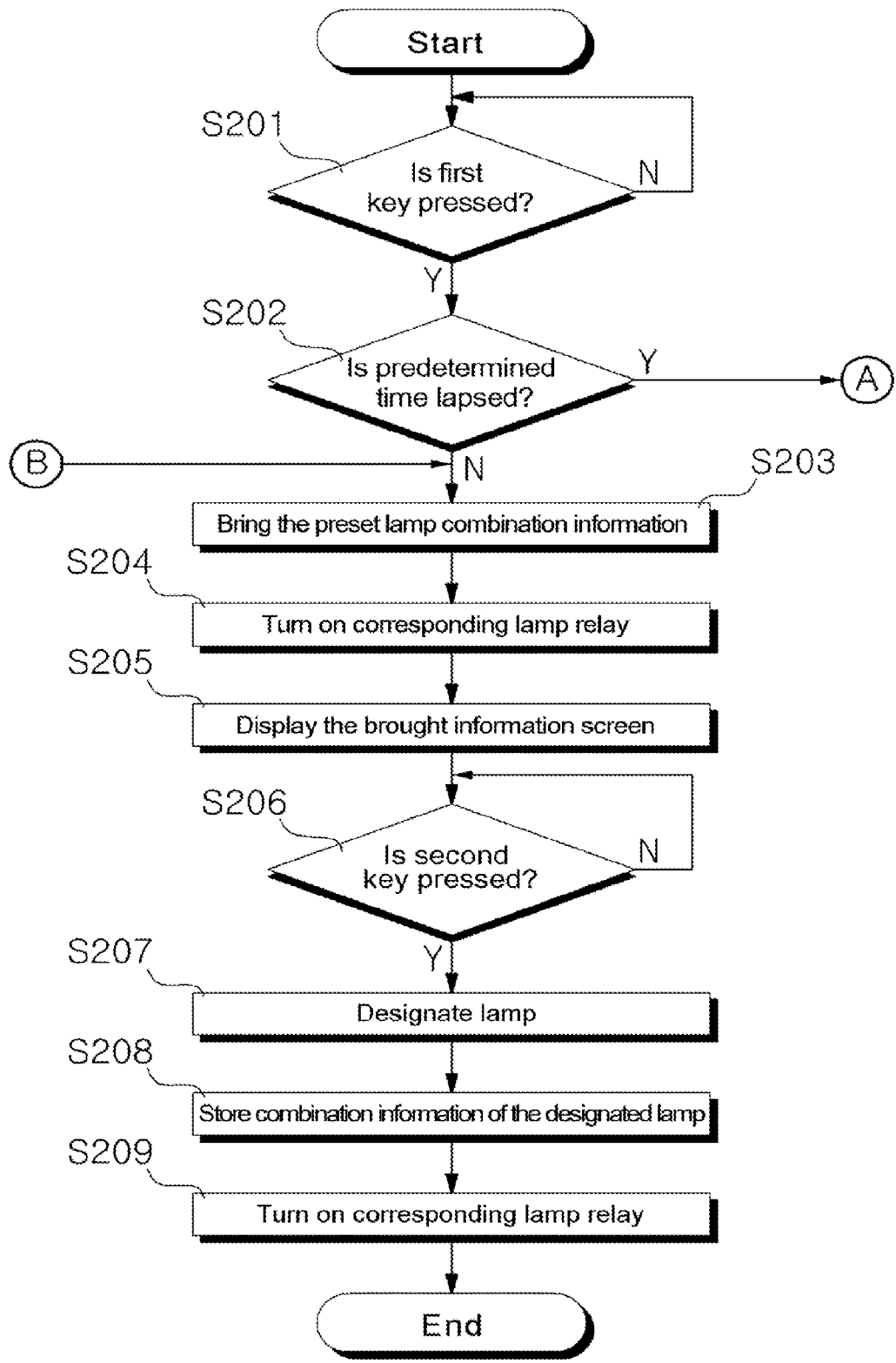
FIG. 2 is a flowchart sequentially showing a process of setting the combination of lamps for a construction machine in accordance with the present invention.
Figure 3:
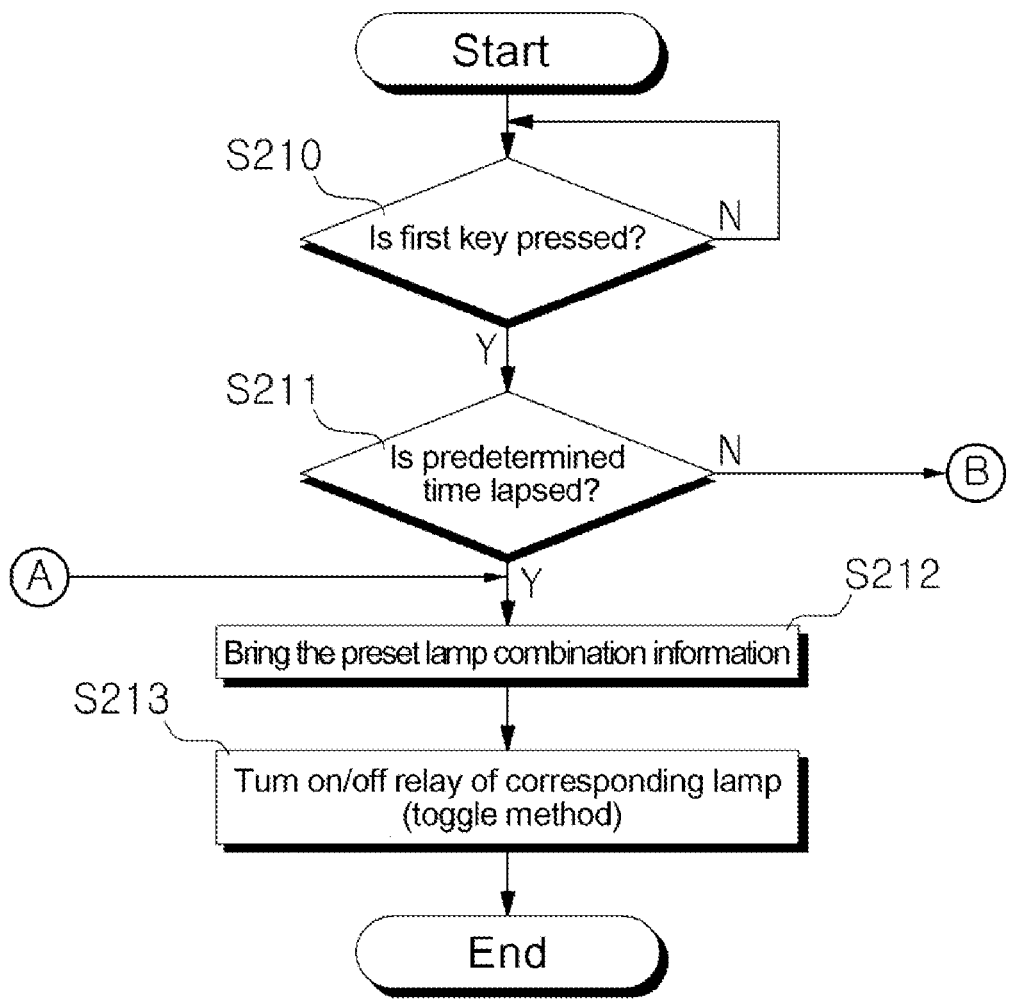
FIG. 3 is a flowchart sequentially showing a lamp control method for a construction machine in accordance with the present invention.

FIGS. 2 and 3 are flowcharts sequentially showing the operation of a lamps control apparatus for a construction machine in accordance with the present invention.

Specifically, FIG. 2 is a flowchart sequentially showing a process of setting the combination of lamps for a construction machine in accordance with the present invention, and FIG. 3 is a flowchart sequentially showing a lamp control method for a construction machine in accordance with the present invention.

Hereinafter, a lamp combination setting aspect and a lamp control aspect in accordance with the present invention will be described with reference to FIGS. 2 and 3.

① Lamp Combination Setting Operation

As shown in FIG. 2, in the lamp combination setting operation in accordance with the present invention, first, the controller compares a first key-pressing time of the first key input means, which is generated according to the key manipulation by an operator with a predetermined reference time (S201 and S202).

Thereafter, if the first key-pressing time of the first key input means does not lapse the predetermined reference time (e.g., one second) as a result of the comparison, the preset lamp combination information of the construction machine is brought (S203).

The controller outputs a relay of a corresponding lamp as an on state based on the brought lamp combination information and turns on the corresponding lamp (S204).

Next, the controller controls the brought lamp combination information to be displayed on a screen (S205).

In this case, the lamp combination information is displayed in the form of a display object (or icon) which is matched to the brought each lamp.

Because there is no lamp combination set by a user upon the initial setting of the lamp combination, the entire information on lamps (e.g., a work lamp, a deck lamp, a cabin lamp, and a rear lamp) included in a corresponding construction machine are displayed on the screen of the screen display unit.

Then, if the thus brought lamp combination information is displayed on the screen, the operator designates a lamp which it is desired to turn on/off (S206 and S207).

In other words, if the lamp combination information brought by the first key input means is displayed on the screen, the controller designates a lamp which it is desired to turn on/off by pressing a predetermined "confirm key" included in the second key input means while shifting a plurality of sub-set keys (e.g., top, bottom, left and right shift keys) included in the second key input means between display objects (or icons) corresponding to the displayed lamp combination information in upward, downward, leftward and rightward directions.

In this case, when the sub-set keys are shifted between the display objects (or icons), a corresponding screen information according to the input of a sub-set key is displayed.

In addition, if a lamp combination is designated by the second key input means among the brought lamp combination information, the designated lamp combination is reset to a lamp combination which it is desired to turn on/off, and corresponding lamp combination information is stored in a memory (S208). Subsequently, the relay of the corresponding lamp is outputted as an on/off state by reflecting the changed information (S209) and then the lamp combination setting aspect in accordance with the present invention is terminated.

Resultantly, the operator can set a lamp combination which it is desired to turn on/off as the operator desires.

On the other hand, if the first key-pressing time of the first key input means lapses the predetermined reference time (e.g., one second) as a result of the comparison, the lamp control operation in accordance with the present invention is performed.

The lamp control operation will be described hereinafter with reference to FIG. 3.

2 Lamp Control Operation

As shown in FIG. 3, in the lamp control operation in accordance with the present invention, first, the controller compares a first key-pressing time of the first key input means, which is generated according to the key manipulation by an operator with a predetermined reference time (S210 and S211).

Thereafter, if the first key-pressing time of the first key input means lapses the predetermined reference time (e.g., one second) as a result of the comparison, the preset lamp combination information of the construction machine is brought (S203).

Because there is no lamp combination set by a user upon the initial setting of the lamp combination, the whole lamps (e.g., a work lamp, a deck lamp, a cabin lamp, and a rear lamp) included in a corresponding construction machine are brought as an on state.

Then, a relay of a corresponding lamp is turned on based on the thus brought lamp combination information. For example, if the operator sets only the work lamp to be turned on, only the work lamp is set as an on state in the brought information, and thus the corresponding relay of the work lamp is controlled to be outputted as an on state. In this case, the current output state is stored by an on/off toggle method. Subsequently, if the input operation of the first key is repeatedly performed in a state where the first key-pressing time of the first key input means lapses the predetermined reference time (e.g., one second), an on/off operation is repeatedly performed in an inverse state to a state stored in the past (S213).

By virtue of this operation, the operator can turn on/off the lamp designated by him or her.

As described above, the present invention a plurality of lamps (e.g., a work lamp, a deck lamp, a cabin lamp, a rear lamp) mounted on a construction machine can be controlled only by a first key input means serving as a representative switch button and a second key input means including a plurality of sub-set keys, thereby reducing the number of unnecessary switches within a cabin to make an equipment manipulation environment more convenient and simple.

In addition, in a construction machine provided with a plurality of lamps, the combination of lamps which is to be controlled depending on the work conditions can readily selected and set so that the operator can easily use the interface means.

Figure 4:
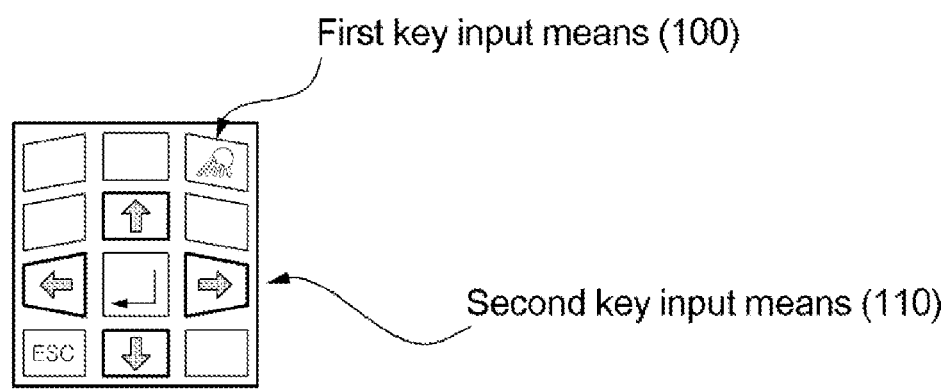
FIG. 4 is an exemplary view showing a key input means in accordance with the present invention.

FIG. 4 is an exemplary view showing a key input means in accordance with the present invention; and As shown in FIG. 4, a key input means in accordance with the present invention includes a first key input means 100 and a second key input means 110.

The first key input means 100 is a user interface means which displays the preset lamp on/off combination information and performs the on/off operation of the respective lamps. That is, the first key input means is operated to display the preset lamp combination information if the first key-pressing time of the first key input means 100 does not lapse the predetermined reference time preset and stored in the controller 120. On the other hand, the first key input means is operated to turn on/off the relay connected to the lamp designated by the second key input means 110 by using the toggle method if the first key-pressing time of the first key input means 100 lapses the predetermined reference time.

That is, the first key input means 100 is a user interface means which display the preset lamp combination information and performs the on/off operation of the respective lamps.

On the other hand, the second key input means 110 includes a plurality of sub-set keys for a user designation, which sets the shift between display objects corresponding to the preset combination lamps and the on/off state of the corresponding lamp object moved. That is, when a combination of preset lamps which it is desired to turn on/off by the first key input means 100 is displayed on a screen, a plurality of sub-set keys (e.g., top, bottom, left and right shift keys) can be shifted between the display objects (or icons) corresponding to the displayed lamp combination information in upward, downward, leftward and rightward directions. In addition, a provided predetermined "confirm key" is pressed to designate a lamp which it is desired to turn on/off.

Figure 5:
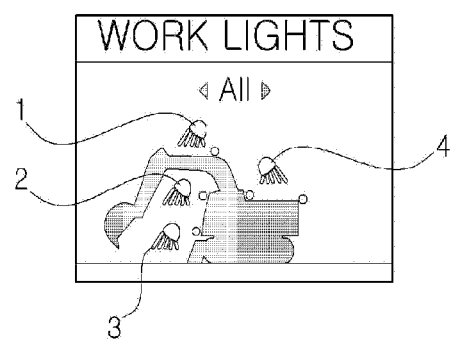
FIG. 5 is an exemplary view showing a screen of a user interface (UI) for displaying lamp combination information in accordance with the present invention.

FIG. 5 is an exemplary view showing a screen of a user interface (UI) for displaying lamp combination information in accordance with the present invention.

As shown in FIG. 5, the present invention brings the preset lamp combination information of the construction machine and display the preset lamp combination information on the screen of the screen display unit if the first key-pressing time of the first key input means, which is generated according to the key manipulation by an operator does not lapse the predetermined reference time (e.g., one second).

In this case, the lamp combination information is displayed in the form of a display object (or icon) which is matched to the brought each lamp (see FIG. 5).

In addition, because there is no lamp combination set by a user upon the initial setting of the lamp combination, the entire information on lamps (e.g., a work lamp, a deck lamp, a cabin lamp, and a rear lamp) included in a corresponding construction machine are displayed on the screen of the screen display unit.

For reference, a display object displayed at the highest position in FIG. 5 is a display object corresponding to a work lamp 1, and a display object displayed at an intermediate position is a cabin lamp 2.

In addition, a display object displayed at the lowest position in FIG. 5 is a display object corresponding to a deck lamp 3, a display object displayed at the rear of the construction machine is a rear lamp 4.

INDUSTRIAL APPLICABILITY

In accordance with the lamp control apparatus for a construction machine and the method for controlling the same of the present invention as constructed above, a plurality of lamps (e.g., a work lamp, a deck lamp, a cabin lamp, a rear lamp) mounted on a construction machine can be controlled only by a first key input means serving as a representative switch button and a second key input means including a plurality of sub-set keys, thereby reducing the number of unnecessary switches within the cabin, which make an equipment manipulation environment more convenient and simple.

While the present invention has been described in connection with the specific embodiments illustrated in the drawings, they are merely illustrative, and the invention is not limited to these embodiments. It is to be understood that various equivalent modifications and variations of the embodiments can be made by a person having an ordinary skill in the art without departing from the spirit and scope of the present invention. Therefore, the true technical scope of the present invention should not be defined by the above-mentioned embodiments but should be defined by the appended claims and equivalents thereof.

The invention claimed is:

1. A lamp control apparatus for a construction machine, which is connected to respective relays of construction machine lamps, and configured to control the on/off operation of the relays, the apparatus comprising:
a first key input means configured to bring a screen for setting the on/off state of the respective lamps and drive the relays to correspond to the on/off state of the lamps which is set to turn on/off the lamps;
a second key input means including keys for instructing the shift between display objects corresponding to the respective lamps and setting an on/off state of the corresponding object on the set screen; and
a controller configured to alternately control the on state of the corresponding relay and the off state of the whole lamp relays using a toggle method according to preset lamp on/off combination information of the construction machine if an input operation of a first key is repeatedly performed in a state where a first key-pressing time of the first key input means is limited within a first predetermined time range, the controller being configured to bring the set screen, perform the shift of the object that corresponds to the lamp designated by an operator's input of the second key input means and set the on/off state of the corresponding lamp, and store the preset lamp on/off combination information if an input operation of the first key is performed in a state where the first key-pressing time is limited within a second predetermined time range that is different from the first predetermined time range.

2. The lamp control apparatus for a construction machine according to claim 1, wherein the controller turns on the corresponding relay by the on/off combination of the preset lamp while displaying the set screen if the input operation of the first key is performed within the second predetermined time range to bring the set screen.

3. The lamp control apparatus for a construction machine according to claim 2, wherein the controller controls the off state of the whole lamp relays using the toggle method if the input operation of the first key is performed with a limitation to the first predetermined time range in a state where the set screen is brought by the input operation of the first key and the corresponding relay is turned on.

4. The lamp control apparatus for a construction machine according to claim 1, wherein the controller comprises:
a time comparison unit configured to compare the first key-pressing time of the first key input means with a predetermined reference time;
a relay control unit configured to control the preset lamp on/off combination information of the construction machine to be displayed on a screen if the input operation of the first key is performed in a state where the first key-pressing time of the first key input means is within a first predetermined time range as a result of comparison by the time comparison unit, and turn on/off the relay connected to the lamp that is designated by the second key input means using the toggle method if the input operation of the first key is performed in a state where the first key-pressing time is within a second predetermined time range that is different from the first predetermined time range; and
a lamp setting unit configured to reset a lamp combination designated by a user through the second key input means among lamp combinations displayed by the relay control unit to a lamp combination which is to be turned on/off.

5. A method for controlling a lamp control apparatus for a construction machine, which is connected to respective relays of construction machine lamps, and configured connected to respective relays of construction machine lamps to control the on/off operation of the relays, comprising:
comparing a first key-pressing time of a first key input means, which displays a preset on/off state of the respective lamps and controls the on/off states of the respective lamps according to the preset on/off state of the respective lamps, with a predetermined reference time;
controlling the turning on of the relay of a corresponding lamp that is set to be turned on using the toggle method to correspond to once or continuous input for a first predetermined time range of the first key or controlling the turning off of the relays of the whole lamps according to lamp on/off combination information of the construction machine, which is preset and stored, if the input operation of the first key is performed in a state where the first key-pressing time of the first key input means is within the first predetermined time range as a result of the comparison;
controlling the display of the reset lamp on/off combination information of the construction machine on a screen if the input operation of the first key is performed in a state where the first key-pressing time is within a second predetermined time range as a result of the comparison;
receiving an input of the shift between the display objects corresponding to the lamps through a second key input means having setting keys in the screen display control step, determining and displaying the shift between the objects and the on/off setting of the lamps corresponding to the moved objects; and
storing on/off combination items of the respective lamps, which are changed in the screen display control step.

6. The method for controlling a lamp control apparatus according to claim 5, wherein the controlling step further comprises controlling the display of the preset lamp on/off combination information of the construction machine on the screen and controlling the on state of the relays of the corresponding lamps according to the preset on/off combination information.

* * * * *